(12) United States Patent
Haenle et al.

(10) Patent No.: US 11,111,899 B2
(45) Date of Patent: Sep. 7, 2021

(54) AXIAL PISTON MACHINE WITH VALVE SLIDES INTEGRATED INTO THE CONNECTOR PLATE

(71) Applicant: Robert Bosch GmbH, Stuttgart (DE)

(72) Inventors: David Haenle, Neu-Ulm (DE); Marcus Herrmann, Elchingen (DE); Raimund Roth, Nersingen (DE); Thomas Abenstein, Buch (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 16/788,482

(22) Filed: Feb. 12, 2020

(65) Prior Publication Data

US 2020/0326003 A1    Oct. 15, 2020

(30) Foreign Application Priority Data

Apr. 10, 2019   (DE) .................... 10 2019 205 140.5

(51) Int. Cl.
  *F03C 1/06*       (2006.01)
  *F03C 1/40*       (2006.01)
  *F16H 61/4104*    (2010.01)

(52) U.S. Cl.
  CPC ....... *F03C 1/0694* (2013.01); *F16H 61/4104* (2013.01); *F03C 1/0623* (2013.01)

(58) Field of Classification Search
  CPC ........ F03C 1/0694; F03C 1/005; F03C 3/109; F16H 61/4104
  See application file for complete search history.

(56) References Cited

U.S. PATENT DOCUMENTS

| | | | |
|---|---|---|---|
| 3,107,632 A * | 10/1963 | Wahlmark | .............. F01B 3/109 91/473 |
| 4,991,492 A | 2/1991 | Bratt et al. | |
| 6,279,452 B1 * | 8/2001 | Moya | .................... F04B 1/2014 91/506 |
| 9,267,590 B2 * | 2/2016 | Essig | ..................... B60K 23/08 |
| 2016/0238043 A1 * | 8/2016 | Miyata | ................ F15B 13/0401 |

FOREIGN PATENT DOCUMENTS

EP     0 849 468 B2    9/2012

* cited by examiner

*Primary Examiner* — F Daniel Lopez
(74) *Attorney, Agent, or Firm* — Maginot, Moore & Beck LLP

(57) ABSTRACT

An axial piston machine of oblique axis design has a pivot angle that is adjustable via a set piston and a control valve and includes a first valve slide that is linearly movable relative to a first valve axis and is connected at two opposite ends to a first or a second fluid port. The first valve slide has a central region that defines a control point at which the lower of pressures at the first and second fluid ports act. The control point is connected via a fixed first throttle and a second throttle to a housing interior. A second valve slide that is linearly movable relative to a second valve axis is configured to adjust the second throttle. The first valve axis is arranged between the set piston and the control valve or a region of the control valve and is oriented transverse to the adjusting axis.

12 Claims, 4 Drawing Sheets

AXIAL PISTON MACHINE WITH VALVE SLIDES INTEGRATED INTO THE CONNECTOR PLATE

This application claims priority under 35 U.S.C. § 119 to patent application no. DE 10 2019 205 140.5, filed on Apr. 10, 2019 in Germany, the disclosure of which is incorporated herein by reference in its entirety.

BACKGROUND

The disclosure relates to an axial piston machine.

EP 849 468 B2 discloses an axial piston machine of oblique axis design, the pivot angle of which is adjustable by means of a set piston and a control valve.

One advantage of the present disclosure lies in the fact that the size of the axial piston machine is small even if the maximum possible pivot angle is selected to be large. In particular, what is known as the installation height is small. The axial piston machine can furthermore be produced easily and at low cost.

SUMMARY

According to the disclosure, it is proposed that a first valve slide is provided which is linearly movable relative to a first valve axis, wherein the first valve slide is connected at its two opposite ends to the first or the second fluid port, wherein a central region of the first valve slide defines a control point, wherein the first valve slide is formed so that the lower of the pressures from the pressure at the first fluid port and the pressure at the second fluid port acts at the control point, wherein the control point is connected via a fixed first throttle and further via a second throttle to an interior of the housing, wherein a second valve slide is provided which is linearly movable relative to a second valve axis, wherein the second throttle is adjustable by movement of the second valve slide, wherein the second valve slide is acted upon by the pressure at the control point in the opening direction of the second throttle, wherein it is acted upon by a first spring in the closing direction of the second throttle, wherein the first valve axis is arranged in the direction of the adjusting axis between the set piston and the control valve or in the region of the control valve, wherein it is oriented transverse to the adjusting axis.

The first valve axis is preferably arranged perpendicular to the adjusting axis. The adjusting axis is preferably a central axis of the set piston. The control valve preferably has a third valve slide and an actuating magnet, wherein the adjusting axis is at the highest preferably a central axis of the third valve slide and/or the actuating magnet. The second valve axis is preferably a central axis of the second valve slide. The first and the second axis of rotation preferably intersect in each setting of the pivot angle.

Advantageous further developments of and improvements to the disclosure are indicated in the dependent claims.

It can be provided that the first valve axis is arranged on that side of the adjusting axis which faces away from the cylinder drum with a spacing from the adjusting axis. At this point, the first valve slide can be received directly in the housing without the housing having to be significantly strengthened or increased in size for this purpose.

It can be provided that the housing comprises a pot-like first housing part in which the driveshaft is rotatably mounted, wherein it, on the side facing away from the driveshaft, forms an opening which is covered with a second housing part which is connected fixedly to the first housing part, wherein the first and the second fluid port are arranged in the second housing part, wherein the first and/or the second valve slide is received in each case in the second housing part. The control valve and/or the set piston are preferably received in each case directly in the second housing part. The first and/or the second valve slide are preferably received directly in the second housing part. The second housing part is preferably formed in one piece. A particularly compact axial piston machine is thus produced.

It can be provided that the first housing part has a flat bearing surface against which the second housing part bears, wherein the first valve axis is arranged parallel to the bearing surface. A particularly compact axial piston machine is thus produced which is furthermore easy to produce. The adjusting axis is preferably arranged parallel to the bearing surface.

It can be provided that the second valve axis is arranged transverse to the first valve axis in such a manner that it lies in a plane with the adjusting axis, wherein it intersects with the first valve axis. The second valve axis is preferably arranged perpendicular to the first valve axis.

It can be provided that an angle between the adjusting axis and the second valve axis is between 15° and 45°. A particularly compact axial piston machine is thus produced.

It can be provided that the second valve axis and the adjusting axis intersect in the region of the control valve. A particularly compact axial piston machine is thus produced.

It can be provided that the second valve slide is arranged on that side of the adjusting axis that faces away from the cylinder drum. The second valve slide can thus be easily mounted from the outside.

It can be provided that several working pistons are received linearly movably in the cylinder drum, which working pistons are coupled in each case via a ball joint to the driveshaft, wherein the driveshaft and the cylinder drum are in rotational drive connection exclusively via the ball joints and the working pistons, wherein the pivot angle is adjustable at least in a range between 0° and 30°. The present disclosure is particularly useful in the case of an axial piston machine which has such a large adjustment range. The working pistons are preferably linearly movable substantially parallel to the second axis of rotation. The angle between the surface normal of the bearing surface and the first axis of rotation is preferably half the maximum pivot angle, at most preferably 15°.

It can be provided that the second valve slide is received in a bore in the housing which is closed with a closing screw towards the outside, wherein the closing screw is arranged so that the first axis of rotation intersects with the closing screw. The stated closing screw is thus particularly easily accessible. The stated bore is preferably arranged directly in the second housing part.

It can be provided that in each case a straight first connecting bore is assigned to the first and/or the second fluid port, which connecting bore connects the relevant fluid port to an assigned end of the first valve slide. Such an axial piston machine can be produced particularly easily and at low cost. The at least one first connecting bore preferably runs substantially parallel to the adjusting axis. The at least one first connecting bore preferably opens out directly into the duct which defines the relevant fluid port. The at least one first connecting bore preferably directly intersects with the bore in which the first valve slide is received.

It can be provided that the second valve slide is connected via a straight second connecting bore to the interior of the housing, wherein in each case a first connecting bore is assigned to the first and the second fluid port, wherein the second connecting bore is arranged between the two first connecting bores. Such an axial piston machine can be used particularly easily and at low cost.

It will be obvious that the above-mentioned features and the features to be explained below can not only be used in the respectively indicated combination, but also in other combinations or on their own without departing from the scope of the present disclosure.

BRIEF DESCRIPTION OF THE DRAWINGS

The disclosure is explained below in greater detail on the basis of the enclosed drawings. In the drawings.

DETAILED DESCRIPTION

Figure 1:
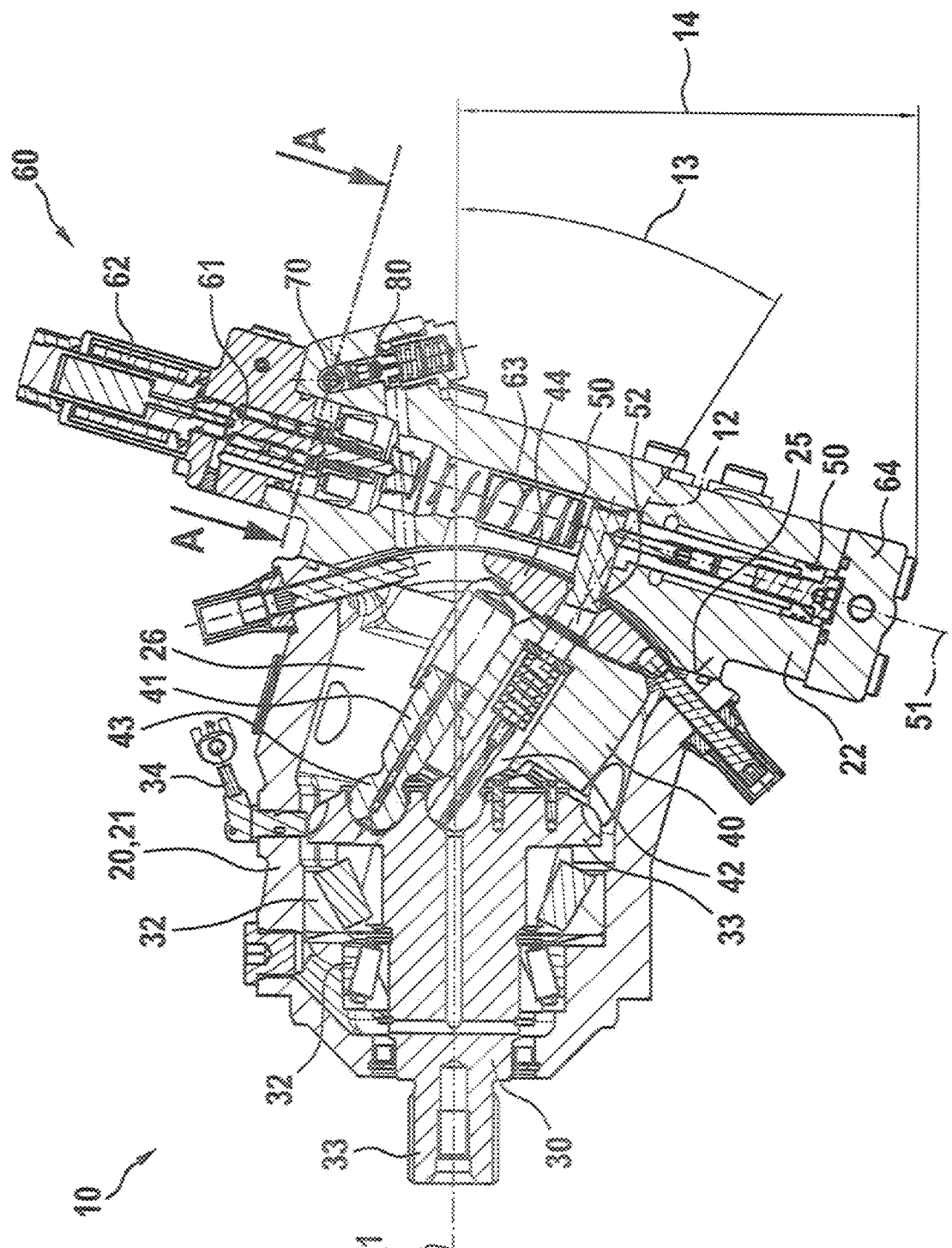
FIG. 1 shows a longitudinal section of an axial piston machine according to the disclosure.

FIG. 1 shows a longitudinal section of an axial piston machine 10 according to the disclosure. Axial piston machine 10 comprises a housing 20 which is composed of a first and a second housing part 21; 22. First housing part 21 is formed to be pot-like. In the region of its base surface, a driveshaft 30 is mounted rotatably relative to a first axis of rotation 11. Bearing is performed by means of two pivot bearings 32 which are embodied in the present case as tapered roller bearings. Driveshaft 30 projects with a drive journal 33 out of housing 20 so that it can be brought into rotational drive connection with a further device (not represented), for example, an internal combustion engine or a vehicle wheel.

On the side facing away from the driveshaft, first housing part 21 has an opening which is continuously bordered by a flat bearing surface 25. Second housing part 22 bears against said bearing surface 25, wherein the corresponding joint gap is closed in a fluid-impervious manner with a sealing ring. The two housing parts 21; 22 jointly delimit an interior 26 which is typically connected to a tank so that a low pressure prevails in interior 26, wherein pressure fluid which collects in interior 26 can flow out towards the tank.

A cylinder drum 40 is received in interior 26, which cylinder drum 40 is rotatable relative to a second axis of rotation 12. Second axis of rotation 12 is defined by a circular-cylindrical centering piston 42 which is received in cylinder drum 40 in a linearly and rotationally movable manner. Centering piston 42 is coupled via a ball joint to driveshaft 30, wherein the center point of the stated ball joint defines a point of intersection of first and second axis of rotation 11; 12.

Moreover, several working pistons 41 are received in a linearly movable manner in cylinder drum 40, which working pistons 41 are arranged distributed evenly around second axis of rotation 12. Working pistons 40 are coupled in each case via an associated ball joint 43 to a flange 31 of driveshaft 30. Flange 31 can be provided on its outer circumferential surface with a plurality of number perforations which can be detected by means of a rotational speed sensor 34 so that the rotational speed and/or the rotational position of driveshaft 30 can be measured. Working pistons 41 are formed to be slightly cone-shaped so that they can tilt slightly relative to cylinder drum 40 during a rotation of cylinder drum 40. A jamming of axial piston machine 10 is thus avoided. The rotational drive connection between driveshaft 30 and cylinder drum 40 is performed in the present case exclusively via working pistons 41 and their ball joints 43. It should be noted in this case that in this regard other solutions such as, for example, tripod entrainment known from U.S. Pat. No. 4,991,492 can also be used. The present axial piston machine is characterized in that a particularly large maximum pivot angle 13 is realized with the particularly simple driving entrainment via the working pistons.

A separate control lens 44 is arranged between cylinder drum 40 and second housing part 22, which control lens 44 is displaceable along a circular path on second housing part 22. The central axis of this circular path intersects with the point of intersection of first and second axis of rotation 21; 22, wherein it runs perpendicular to the drawing plane of FIG. 1. The bearing surface between cylinder drum 40 and control lens 44 is formed to be rotationally symmetrical relative to second axis of rotation 12, wherein it is formed to be preferably spherical or flat.

A set piston 50 is received movably in the direction of adjusting axis 51 in second housing part 22. Present axial piston machine 10 is configured for an adjustment range of pivot angle 13 which ranges from 0° to 32°. The adjustment range is extraordinarily large in combination with the simple rotational entrainment explained above. Adjusting axis 51 is therefore not oriented perpendicular to first axis of rotation 11. The corresponding angle in the present case is rather 90° minus half the maximum pivot angle, i.e. 74°. It will be obvious that other angles can be used.

A driver 52 engages in adjusting pistons 50, which driver 52 furthermore engages in control lens 44. The position of second axis of rotation 12 of cylinder drum 40 can correspondingly be adjusted by a movement of set piston 50 and thus pivot angle 13 which defines the displacement volume of axial piston machine 10. Pivot angle 13 is the angle between first and second axis of rotation 11; 12.

Set piston 50 is adjusted with a control pressure which acts from the side of cover 64 on set piston 50, wherein the pressure in the interior of housing 20 bears on the opposite side of set piston 50. This control pressure is conducted via bores (no. 65 in FIG. 3) in second housing part 22 from control valve 60 to cover 64 and from there into the bore in which set piston 50 is received. Control valve 60 and cover 64 are arranged on opposite sides of set piston 50.

In the present case, an electro-proportional setting of pivot angle 13 is realized with control valve 60, in the case of which pivot angle 13 is approximately proportional to the electric actuation of actuating magnet 62. One particular feature of this adjustment lies in the fact that the position of adjusting piston 50 is transferred by means of third spring 63 to third valve slide 61 of control valve 60.

The present disclosure can, however, also be used with any other control principle. The sole requirement is that corresponding control valve 60 is arranged coaxially to adjusting axis 51 and indeed next to set piston 50.

First and second valve slides 70; 80 should furthermore be pointed out which are explained in greater detail below with reference to FIGS. 3 and 4.

Axial piston machine 10 according to the disclosure is characterized in particular in that installation height 14 is particularly small, wherein maximum pivot angle 13 is particularly large. Installation height 14 is measured perpendicularly from first axis of rotation 11 up to the point of axial piston machine 10 spaced furthest apart from first axis of rotation 11.

Figure 2:
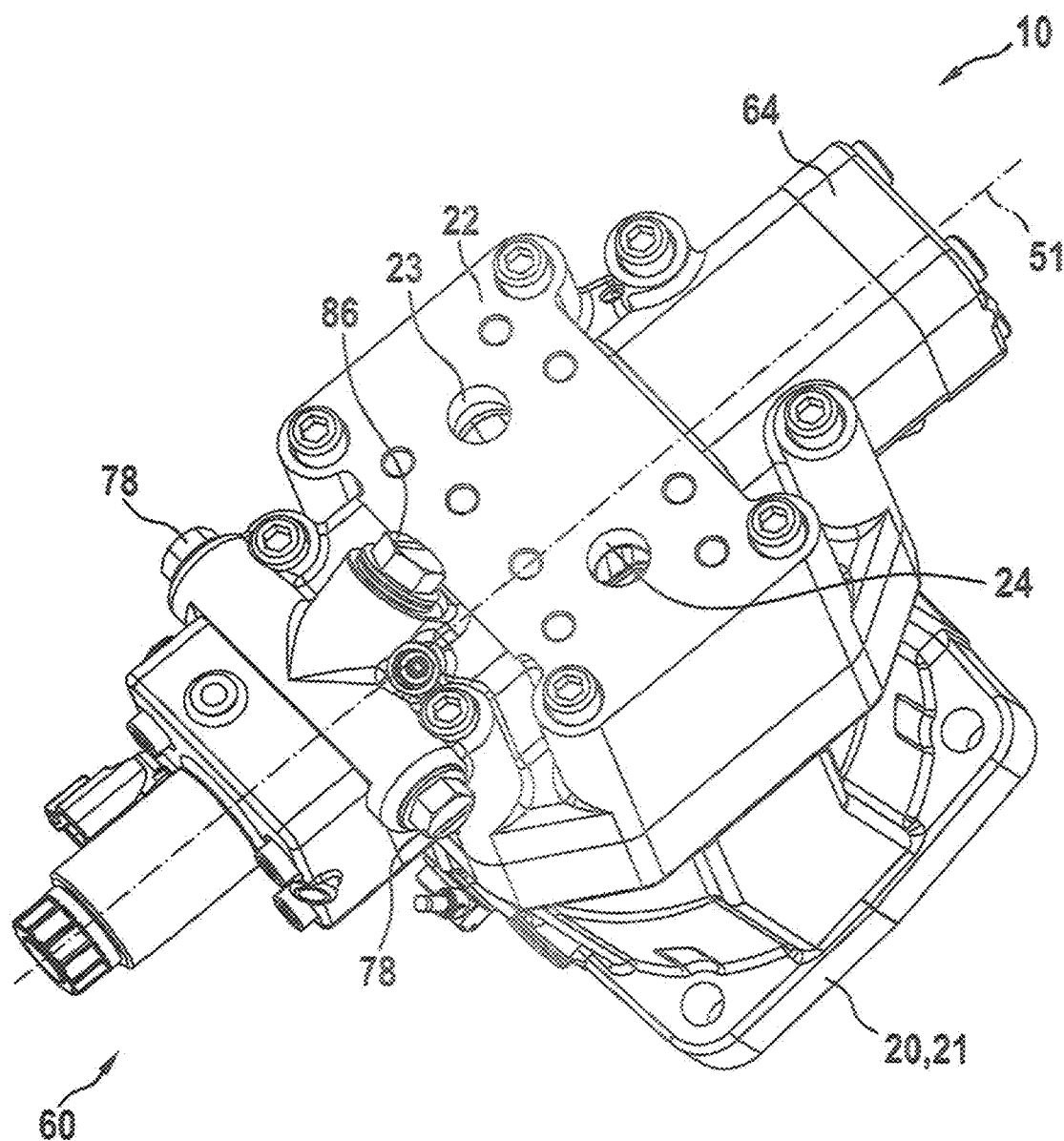
FIG. 2 shows a perspective view of the axial piston machine according to FIG. 1.

FIG. 2 shows a perspective view of axial piston machine 10 according to FIG. 1. In particular housing 20 with first and second housing part 21; 22 is apparent. Axial piston machine 10 has a first and a second fluid port 23; 24. If the cylinder drum rotates, pressure fluid is exchanged between first and second fluid port 23; 24.

Pressure fluid is preferably a fluid, most preferably hydraulic oil. Axial piston machine 10 is preferably used in a closed hydraulic circuit. It is usually operated as a hydraulic motor.

As seen in the direction of the first axis of rotation, first and second fluid port 23; 24 are arranged symmetrically relative to adjusting axis 51. The pressure fluid can thus be conducted in a particularly simple manner to both opposing ends of the first valve slide (no. 70 in FIG. 3), namely with straight connecting bores (no. 23*a*; 24*a* in FIG. 3) which run substantially parallel to adjusting axis 51.

Closing screws 78; 86 are furthermore apparent with which the bores are closed in which first and second valve slides (no. 70; 80 in FIG. 1) are received.

Figure 3:
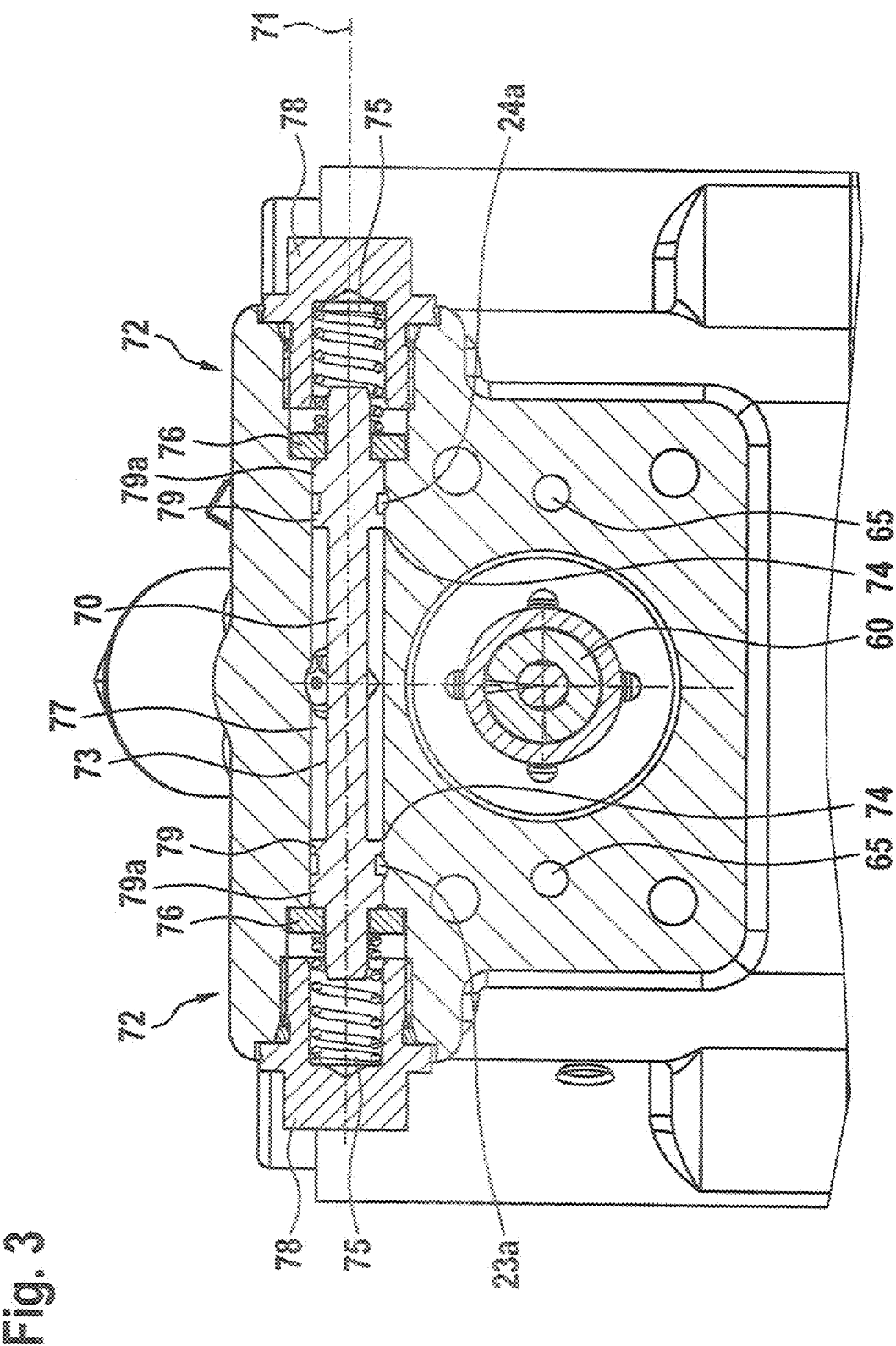
FIG. 3 shows a sectional view of the axial piston machine according to FIG. 1, wherein the sectional plane in FIG. 1 is designated by A-A.

FIG. 3 shows a sectional view of the axial piston machine according to FIG. 1, wherein the sectional plane in FIG. 1 is designated by A-A. First valve slide 70 is received in a circular-cylindrical bore in second housing part 22 so that it is linearly movable in the direction of a first valve axis 71 which is defined by the central axis of the stated bore. The stated bore is closed at its two opposing ends in each case with a closing screw 78.

First valve slide 70 has at both ends in each case a collar 79 which forms a control edge 74 which runs around first valve axis 71 in a circular ring shape in each case at its side facing toward the center of first valve slide 70. Both control edges 74 form in each case an adjustable throttle which is switched between control point 77 and first and second fluid port, wherein the latter connection is conveyed via connecting bores 23*a*; 24*a*.

Both collars 79 are divided in each case by a circumferential groove into two portions, wherein exclusively outer or end-side portion 79*a* is provided with a lateral flattened portion in order to conduct the pressure from the assigned first or second fluid port to the assigned end side of first valve slide 70. As a result, control point 77, i.e. the region between the two collars 79, is connected to a first fluid port if the pressure at the second fluid port is greater than the pressure at the first fluid port. In the reverse case, control point 77 is connected to the second fluid port.

In the depressurized state, first valve slide 70 is pretensioned by two second springs 75 into a central position in which the throttles are both closed at control edges 74 so that control point 77 is not connected to any of the two fluid ports. Second springs 75 act in each case via an assigned spring plate 76 on first valve slide 70 so that its central position is exactly defined. To the side of the central position of first valve slide 70, in each case one of the two spring plates bears against second housing part 22 so that the force of relevant second spring 75 is no longer transmitted to first valve slide 70.

First valve axis 71 is oriented perpendicular to the adjusting axis (no. 51 in FIG. 2). It is arranged on the side facing away from the cylinder drum (no. 40 in FIG. 1) with a spacing from the adjusting axis. It is apparent from FIG. 3 that first valve slide 70 is arranged with a very small spacing next to control valve 60 so that the axial piston machine has a particularly space-saving design.

Figure 4:
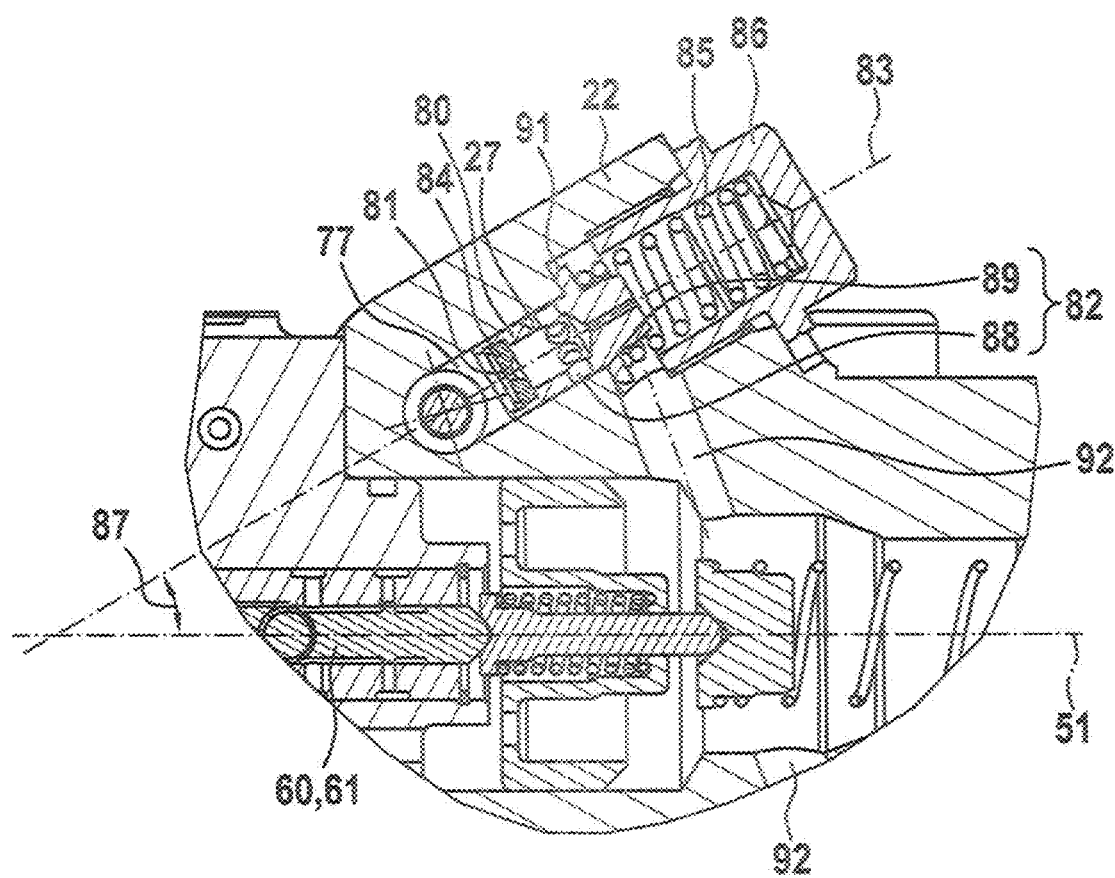
FIG. 4 shows an enlarged cut-out from FIG. 1 in the region of the second valve slide.

FIG. 4 shows an enlarged cut-out from FIG. 1 in the region of second valve slide 80. Second valve slide 80 is received in a linearly movable manner in a circular-cylindrical bore 27. The central axis of stated bore 27 defines a second valve axis 83 which intersects with adjusting axis 51, wherein the corresponding point of intersection is arranged in the region of control valve 60. The angle between adjusting axis 51 and second valve axis 83 is, for example, 30°. Bore 27 can thus on one hand be closed without any problems by closing screw 86, wherein the components assigned to second valve slide 80 nevertheless project slightly to the outside.

Second valve slide 80 is formed to be pot-shaped, wherein it has on its base side a collar which forms an end stop. Second valve slide 80 is acted upon by a first spring which bears against stated collar 91, wherein it pushes collar 91 in the depressurized state against second housing part 22.

Control point 77 is arranged on that side of second valve slide 80 which faces away from first spring 85 so that the pressure which acts there acts upon second valve slide 80 in the opening direction of second throttle 82. Second throttle 82 is formed by several radial bores in second valve slide 80 which interact with a control edge 90, which is circumferential in a circular ring shape, on second housing part 22. In the depressurized state, second throttle 82 is fully closed. It opens if the pressure at control point 77 exceeds the pressure equivalent of pretensioned first spring 85. The pressure fluid then flows from control point 77 via first throttle 81, further via second throttle 82, further via connecting bore 92 into the interior (no. 26 in FIG. 1) of the axial piston machine. Connecting bore 92 intersects with adjusting axis 51 so that it is interrupted by the bore in which the set piston (no. 50 in FIG. 1) is received.

First throttle 81 has a fixed flow resistance. It is formed by a separate disk 84 which is installed fixedly at the open end of pot-like second valve slide 80. If second throttle 82 is opened, the pressure difference between the pressure at control point 77 and the pressure in the interior is substantially applied on first throttle 81. First throttle 81 correspondingly determines how much pressure fluid flows out from the lower pressure fluid port (no. 23 or 24 in FIG. 2) into the interior of the housing and from there further into the tank.

REFERENCE NUMBERS

10 Axial piston machine
11 First axis of rotation
12 Second axis of rotation
13 Pivot angle
14 Installation height
20 Housing
21 First housing part
22 Second housing part
23 First fluid port
23*a* First connecting bore to the first fluid port
24 Second fluid port
24*a* First connecting bore to the second fluid port
25 Bearing surface
26 Interior
27 Bore for second valve slide
30 Driveshaft
31 Flange
32 Pivot bearing
33 Drive journal
34 Rotational speed sensor
40 Cylinder drum 41 Working piston
42 Centering piston
43 Ball joint
44 Control lens
50 Set piston
51 Adjusting axis
52 Driver
60 Control valve
61 Third valve slide
62 Actuating magnet
63 Third spring (feedback spring)
64 Cover
65 Bore for control pressure
70 First valve slide
71 First valve axis
72 End of the first valve slide
73 Central region of the first valve slide
74 Control edge
75 Second spring
76 Spring plate
77 Control point
78 Connecting screw
79 Collar
79a Outer portion of the collar with lateral flat portion
80 Second valve slide
81 First throttle
82 Second throttle
83 Second valve axis
84 Disk (with first throttle)
85 First spring
86 Closing screw
87 Angle between the adjusting axis and the second valve axis
88 Radial bore
90 Control edge
91 Collar
92 Second connecting bore

What is claimed is:

1. An axial piston machine, comprising:
a housing;
a driveshaft mounted rotatably in the housing relative to a first axis of rotation via at least one pivot bearing;
a cylinder drum configured to rotate relative to a second axis of rotation and disposed in rotational drive connection with the driveshaft;
a set piston received linearly movably in the housing in a direction of an adjusting axis, the set piston disposed in entraining connection with the cylinder drum such that a pivot angle between the first and second axes of rotation is adjustable, the housing having a first fluid port and a second fluid port that are connected to the cylinder drum such that a rotation of the cylinder drum involves a fluid flow between the first and second fluid ports when the pivot angle is different from zero;
a control valve arranged coaxially to the adjusting axis;
a first valve slide that is linearly movable in a direction of a first valve axis the first valve slide having a first end connected to the first fluid port and a second end connected to the second fluid port, the first valve slide having a central region that defines a control point and being configured such that a lower of pressures from a pressure at the first fluid port and a pressure at the second fluid port is connected to the control point, the control point connected via a fixed first throttle and further via a second throttle to an interior of the housing; and
a second valve slide that is linearly movable in a direction of a second valve axis and configured to adjust the second throttle via movement of the second valve slide, the second valve slide acted upon by (i) a pressure at the control point in an opening direction of the second throttle and (ii) a first spring in a closing direction of the second throttle,
wherein the first valve axis is (i) arranged in the direction of the adjusting axis between the set piston and the control valve or in a region of the control valve and (ii) oriented transverse to the adjusting axis.

2. The axial piston machine according to claim 1, wherein the first valve axis is arranged on a side of the adjusting axis that faces away from the cylinder drum with a spacing from the adjusting axis.

3. The axial piston machine according to claim 1, wherein:
the housing comprises a pot-like first housing part in which the driveshaft is rotatably mounted,
the first housing part, on a side facing away from the driveshaft, defines an opening that is covered with a second housing part that is connected fixedly to the first housing part,
the first and second fluid ports are arranged in the second housing part, and
one or more of the first valve slide and the second valve slide is received in the second housing part.

4. The axial piston machine according to claim 3, wherein the first housing part has a flat bearing surface against which the second housing part bears, and wherein the first valve axis is arranged parallel to the bearing surface.

5. The axial piston machine according to claim 1, wherein the second valve axis is arranged transverse to the first valve axis in such a manner that the second valve axis lies in a plane with the adjusting axis and intersects with the first valve axis.

6. The axial piston machine according to claim 5, wherein an angle between the adjusting axis and the second valve axis is between 15° and 45°.

7. The axial piston machine according to claim 5, wherein the second valve axis and the adjusting axis intersect in the region of the control valve.

8. The axial piston machine according to claim 5, wherein the second valve slide is arranged on a side of the adjusting axis that faces away from the cylinder drum.

9. The axial piston machine according to claim 1, wherein:
several working pistons are received linearly movably in the cylinder drum, each of the working pistons coupled by a respective ball joint to the driveshaft,
the driveshaft and the cylinder drum are in rotational drive connection exclusively via the ball joints and the working pistons, and
the pivot angle is adjustable at least in a range between 0° and 32°.

10. The axial piston machine according to claim 1, wherein the second valve slide is received in a bore in the housing which is closed with a closing screw towards the outside, and wherein the closing screw is arranged so that the first axis of rotation intersects with the closing screw.

11. The axial piston machine according to claim 1, wherein each of two straight first connecting bores is assigned to a respective one of the first fluid port and the second fluid port, and wherein each respective first connecting bore connects the respective fluid port to a respective one of the first and second ends of the first valve slide.

12. The axial piston machine according to claim 11, wherein the second valve slide is connected via a straight second connecting bore to the interior of the housing, and wherein the second connecting bore is arranged between the two first connecting bores.

* * * * *